US009182036B2

(12) United States Patent
Wilke

(10) Patent No.: US 9,182,036 B2
(45) Date of Patent: Nov. 10, 2015

(54) BINARY CLUTCH DISENGAGEMENT CONTROL IN A NEUTRAL SHIFT

(71) Applicant: GM GLOBAL TECHNOLOGY OPERATIONS LLC, Detroit, MI (US)

(72) Inventor: Nathaniel E. Wilke, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 14/140,028

(22) Filed: Dec. 24, 2013

(65) Prior Publication Data

US 2015/0176701 A1 Jun. 25, 2015

(51) Int. Cl.
| | |
|---|---|
| *B60W 10/02* | (2006.01) |
| *B60W 10/06* | (2006.01) |
| *F16H 61/04* | (2006.01) |
| *F16H 61/02* | (2006.01) |
| *B60W 10/11* | (2012.01) |
| *B60W 10/115* | (2012.01) |

(52) U.S. Cl.
CPC ............ *F16H 61/0213* (2013.01); *B60W 10/02* (2013.01); *B60W 10/06* (2013.01); *B60W 10/11* (2013.01); *F16H 61/0403* (2013.01); *F16H 2061/044* (2013.01); *F16H 2061/0481* (2013.01)

(58) Field of Classification Search
CPC ................. F16H 2061/044; F16H 2061/0474; F16H 2061/0481
USPC ............................................................ 477/63
See application file for complete search history.

(56) References Cited

U.S. PATENT DOCUMENTS

| | | | | |
|---|---|---|---|---|
| 8,306,709 | B2 * | 11/2012 | Lee et al. ......................... | 701/54 |
| 2007/0240955 | A1 * | 10/2007 | Zenno ........................... | 192/3.54 |
| 2013/0196814 | A1 * | 8/2013 | Gumpoltsberger et al. .. | 475/284 |
| 2014/0074362 | A1 * | 3/2014 | Arnold et al. .................... | 701/54 |
| 2014/0121906 | A1 * | 5/2014 | Dlugoss et al. ................. | 701/48 |
| 2014/0121914 | A1 * | 5/2014 | Neelakantan et al. .......... | 701/53 |
| 2014/0121923 | A1 * | 5/2014 | Dlugoss .......................... | 701/67 |

* cited by examiner

*Primary Examiner* — Terry Chau
(74) *Attorney, Agent, or Firm* — Quinn Law Group, PLLC

(57) ABSTRACT

A vehicle includes an engine, a transmission having a friction clutch and a binary clutch assembly, and a controller. The controller executes a method to detect the requested shift of the transmission to neutral, and when a set of conditions are satisfied during the requested shift, to automatically decrease a pressure command to the friction clutch such that torque capacity of the friction clutch decreases from a full torque capacity and begins to slip. The controller holds the binary clutch assembly at a calibrated pressure while the friction clutch slips, disengages the binary clutch assembly only when the binary clutch assembly is released and not loaded, and increases the pressure command to the friction clutch to restore full torque capacity to the friction clutch and complete the requested shift to neutral.

20 Claims, 2 Drawing Sheets

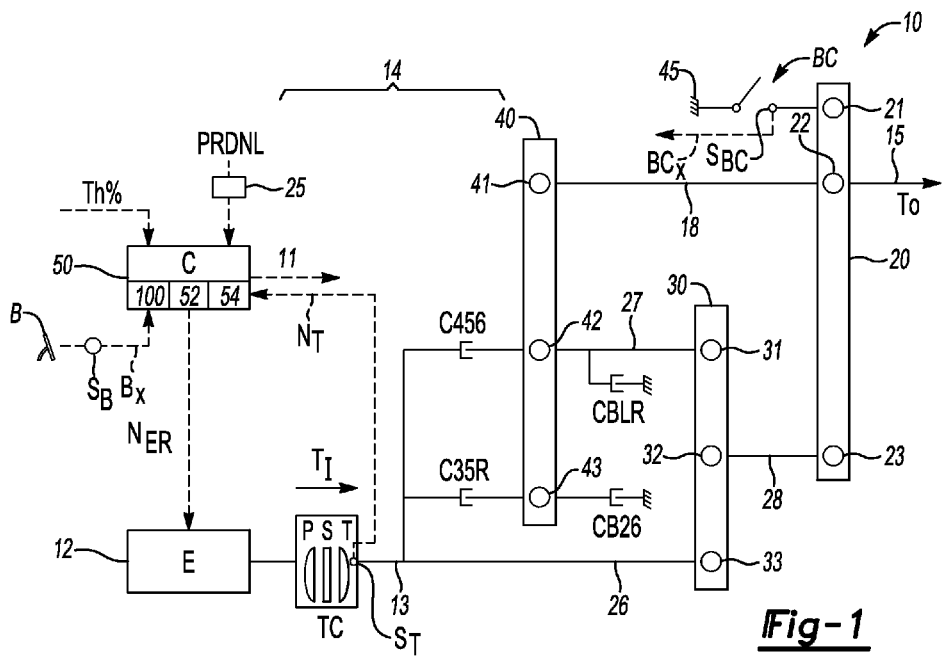
*Fig-1*
| | CBLR | CB26 | C35R | C456 | BC |
|---|---|---|---|---|---|
| D-N | AST | - | - | - | OFG |
| D-R | AST | - | ONC | - | OFG |
*Fig-2*
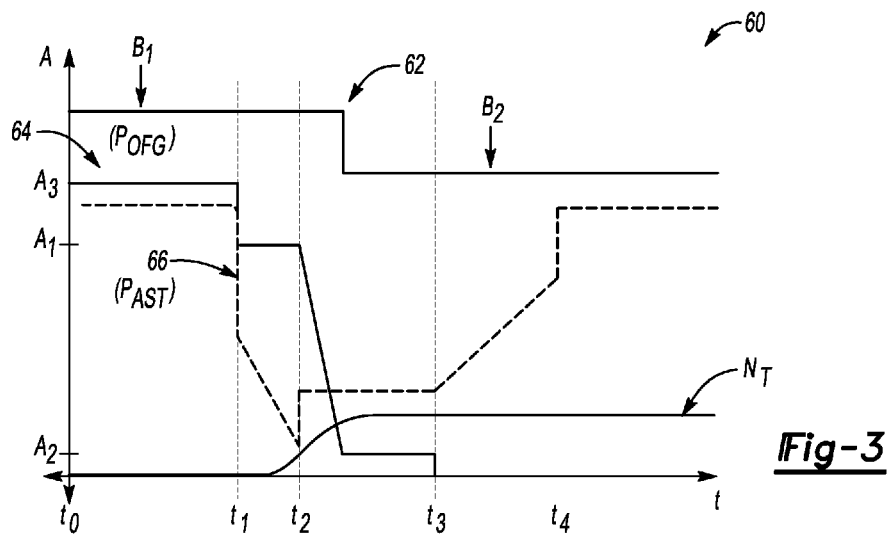
*Fig-3*

BINARY CLUTCH DISENGAGEMENT CONTROL IN A NEUTRAL SHIFT

TECHNICAL FIELD

The present disclosure relates to binary clutch disengagement control in a neutral shift.

BACKGROUND

An automatic transmission includes a shift controller and one or more gear sets. Rotatable input and output members of the transmission are selectively coupled to establish a desired speed ratio, with coupling achieved via hydraulic engagement of one or more friction clutches. Some friction clutches may connect an element of a gear set to a stationary member and thereby operate as a braking clutch, while other friction clutches connect one rotating member to another and thus act as rotating clutches. The clutch apply state of a conventional friction clutch ranges anywhere from fully-applied to fully-released.

In some transmissions, a binary clutch assembly is used in lieu of one of the friction clutches. A binary clutch assembly, such as a dog clutch or a selectable one-way clutch having a freewheeling element, relies on interference rather than friction material to hold torque. Binary clutch assemblies can be used alone or in conjunction with friction clutches to attain certain gear states, e.g., first gear. Unlike conventional friction clutches, a binary clutch assembly has just two possible clutch states: fully-applied and fully-released. When fully applied, the binary clutch assembly cannot rotate in either rotational direction. When released, the binary clutch assembly is able to rotate freely in either/both directions depending on the design.

SUMMARY

A vehicle is disclosed herein. The vehicle includes an engine and a transmission assembly, the latter of which may include an input member, an output member, one or more gear sets, and one or more friction clutches of the type described above. The transmission assembly also includes a binary clutch assembly and a shift controller. The controller, which may be embodied as a computer device(s) having a processor and memory as described herein, executes process instructions to ensure that a smooth disengagement of the binary clutch assembly occurs, particularly during a garage shift to neutral or any other event during which the binary clutch assembly may still be loaded regardless of its actual release state.

As used herein, the term "garage shift" refers to a commanded drive-to-neutral (D-to-N) or drive-to-reverse (D-to-R) shift, which are two example shift maneuvers in which the binary clutch assembly acts as an offgoing clutch and neutral is the transmission state that is ultimately achieved. Use of the binary clutch assembly in a transmission in lieu of a friction clutch may help to reduce parasitic spin losses during the garage shift or other shift maneuvers in which the binary clutch assembly is disengaged to execute the shift, or in a fixed gear state or range in which the binary clutch assembly is disengaged. Reduced spin losses in turn increases overall transmission efficiency and vehicle fuel economy, and therefore the present method and system are intended to contribute to such efficiency gains.

However, underlying the present invention is the recognition made herein that when the engine is running and the vehicle is stationary or slowly rolling, input torque to the transmission may still exert a small amount of reaction torque on the binary clutch assembly. This reaction torque cannot be fully removed simply by releasing the vehicle's brakes or by shutting off the engine. In order to disengage the binary clutch assembly to achieve a neutral transmission state, the controller described herein automatically decreases torque capacity of one or more designated assisting clutches, i.e., one of the friction clutches noted above. This allows the assisting clutch to temporarily slip. The binary clutch assembly is then disengaged only when the controller verifies that the binary clutch assembly is no longer under load. Once the binary clutch assembly is disengaged, pressure can be restored to the assisting clutch(es) to complete the shift to neutral.

In a particular embodiment, the vehicle includes an engine, a transmission, and a controller. The transmission includes a friction clutch and a binary clutch assembly. The controller, which is in communication with the transmission, includes a processor and tangible, non-transitory memory on which is recorded instructions for executing a requested shift of the transmission to neutral. Execution of the instructions by the processor causes the controller to detect the requested shift while a set of predetermined conditions are satisfied, e.g., when the engine is running, the vehicle is stationary or rolling at a slow rate of speed, the brakes are applied, etc. The controller also automatically decreases a pressure command to the friction clutch to a calibrated pressure such that torque capacity of the friction clutch decreases from a full torque capacity and begins to slip, and also determines whether the binary clutch assembly is loaded/applied. The controller disengages the binary clutch assembly only when the friction clutch is slipping and the binary clutch assembly is not loaded, and increases the pressure command to the friction clutch to restore the full torque capacity of the friction clutch and complete the requested shift to neutral.

An assembly is also disclosed having the transmission and controller noted above.

A method of shifting a transmission in a vehicle having an engine, a friction clutch, and a binary clutch assembly includes detecting the requested shift of the transmission to neutral, including determining if a speed of the vehicle below a low calibrated threshold and the engine is running. The method also includes determining whether a set of conditions is satisfied, and only when the set of conditions is satisfied during the requested shift, automatically decreasing a pressure command to the friction clutch such that torque capacity of the friction clutch decreases from a full torque capacity and begins to slip. When these conditions are present, the method also includes holding the binary clutch assembly at a calibrated pressure while the friction clutch slips, disengaging the binary clutch assembly only when the binary clutch assembly is released and not loaded, and increasing the pressure command to the friction clutch to thereby restore the full torque capacity of the friction clutch and complete the requested shift to neutral.

The above features and the advantages of the present disclosure are readily apparent from the following detailed description of the best modes for carrying out the invention when taken in connection with the accompanying drawings.

BRIEF DESCRIPTION OF THE DRAWINGS

FIG. 1 is a schematic lever diagram illustration of an example vehicle having an automatic transmission with a binary clutch assembly and a controller which controls a shift to neutral as set forth herein.

FIG. 2 is a table describing the clutches used in the vehicle of FIG. 1 during an example garage shift to neutral.

FIG. 3 is a time plot of vehicle parameters controlled in the execution of the present method, with time depicted on the horizontal axis and amplitude depicted on the vertical axis.

DETAILED DESCRIPTION

Figure 4:
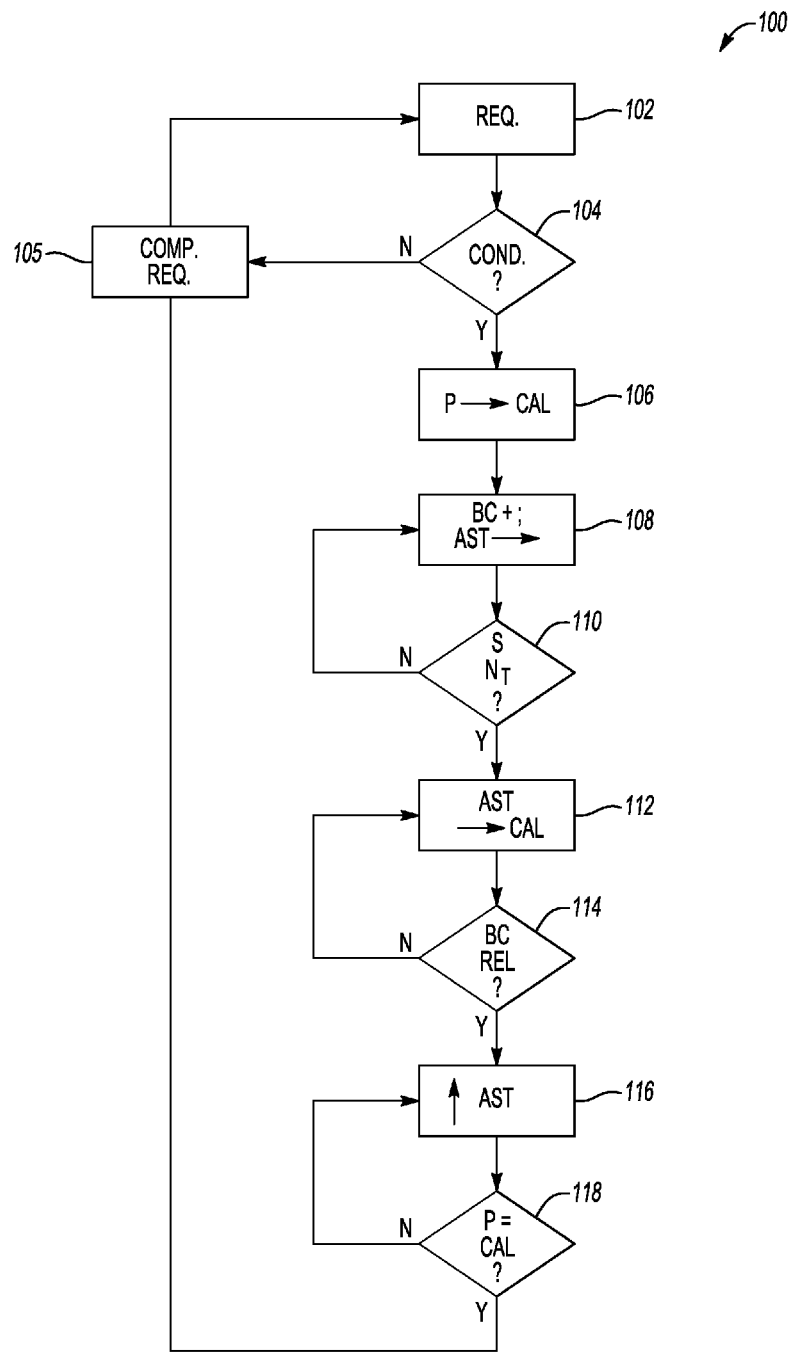
FIG. 4 is a flow chart describing an example method of controlling the transmission of FIG. 1 during a garage shift to neutral.

Referring to the drawings, wherein like reference numbers reference to similar components in the various Figures, an example vehicle 10 is shown schematically in FIG. 1. The vehicle 10 includes an internal combustion engine (E) 12, an automatic transmission 14 having a binary clutch assembly (BC), and a controller (C) 50, with the transmission 14 and controller 50 together forming a transmission assembly for the vehicle 10 as explained herein. The controller 50 is programmed in software and equipped in hardware to control operations of the transmission 14, including execution of a garage shift of the transmission 14 to neutral (N) from or drive (D) from a standstill or from a slow rolling state, i.e., a low non-zero threshold speed such as 3-5 KPH. While such a shift maneuver is typically executed while backing the vehicle 10 into or out of a garage, any rolling forward or reverse shift that includes a final or intermediate step of achieving neutral during which the binary clutch assembly (BC) must be disengaged may be similarly controlled using the presently disclosed approach.

The controller 50 of FIG. 1 automatically executes instructions embodying a method 100, an example of which is shown in FIG. 4 and described below with additional reference to FIG. 3. Specifically, the controller 50 executes the method 100 to precisely time an application of the binary clutch assembly (BC) via clutch control signals (arrow 11), and to thereby minimize the effect of forces acting on the binary clutch assembly (BC) during the shift. The intended result is an improvement of shift quality and feel, i.e., by reducing output torque disturbances or noise during a range change, particularly during a garage shift of the type described above. Relative to conventional control methods, execution of the present method 100 may help reduce the level of noise, vibration, and harshness in the vehicle 10 during execution of a garage shift.

The engine 12 of the example vehicle 10 shown in FIG. 1 may be coupled to the transmission 14 via a hydrodynamic torque converter (TC) having a pump (P), a stator (S), and a turbine (T), or via another torque transfer mechanism such as an input clutch. A turbine speed sensor ($S_T$) may be used to measure turbine speed (arrow $N_T$) and communicate the measured turbine speed (arrow $N_T$) to the controller 50, or such a speed may be determined via calculation or modeling as is well known in the art. An input member 13 of the transmission 14 receives input torque (arrow $T_I$) from the engine 12 via the turbine (T). The transmission 14 ultimately delivers output torque (arrow $T_O$) via an output member 15 of the transmission 14 to some or all of the drive wheels (not shown) of the vehicle 10.

Structurally, the controller 50 may include at least one processor 52 along with tangible, non-transitory memory 54, e.g., read-only memory (ROM), flash memory, optical memory, additional magnetic memory, etc. The controller 50 may also include random access memory (RAM), electrically programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the method 100 are recorded in the memory 54 and executed via the processor(s) 52.

As part of the present method 100, the controller 50 shown in FIG. 1 may receive a throttle signal (arrow Th %), turbine speed (arrow $N_T$), and a braking signal (arrow $B_X$), e.g., from a pedal position or force sensor ($S_B$) connected to a brake pedal (B). The controller 50 is also in communication with a Park, Reverse, Neutral, Drive, and Low (PRNDL) valve 25. The controller 50 receives a PRNDL setting describing the position of the PRNDL valve 25 and selectively transmits the clutch control signals (arrow 11) to the transmission 14 to cause engagement or release of the binary clutch assembly (BC) as needed, as well as of some or all of the oncoming, offgoing, assisting, or holding clutches needed for completing the shift maneuver as described below with reference to FIGS. 2-4. The binary clutch assembly (BC) may include an optional binary clutch position sensor ($S_{BS}$) which measures and transmits a position signal (arrow $BC_X$) to the controller 50 as part of the method 100.

In addition to the clutch control signals (arrow 11), the controller 50 may also selectively transmit an engine speed request (arrow $N_{ER}$) to the engine 12, e.g, to help unload the binary clutch assembly (BC) such as when rolling down an incline or during other shifts not described herein. In a possible embodiment, the controller 50 may include multiple control modules, such as a dedicated engine control module (ECM) and a transmission control module (TCM)(not shown), with the ECM controlling the speed and other operations of the engine 12 and the TCM controlling the functionality of the transmission 14. However, for illustrated simplicity the controller 50 is shown in FIG. 1 as a single element, e.g., as a powertrain control module (PCM).

The transmission 14 of FIG. 1 is shown in schematic lever diagram format. At least one node of the transmission 14 is connected to the binary clutch assembly (BC), e.g., a dog clutch, a selectable one-way clutch, or any other device having only the two binary torque capacity states of fully-applied/engaged and fully-released as explained above. In the example configuration of FIG. 1, the transmission 14 may include first, second, and third gear sets 20, 30, and 40, respectively. The first gear set 20 may include respective first, second, and third nodes 21, 22, and 23. The second and third gear sets 30 and 40 may likewise have respective first, second, and third nodes. For the second gear set 30, the first, second, and third nodes are shown as nodes 31, 32, and 33, respectively. The third gear set 40 includes respective first, second, and third nodes 41, 42, and 43.

With respect to the first gear set 20, the first node 21 is selectively connected to a stationary member 45 of the transmission 14 via application of the binary clutch assembly (BC). In FIG. 1, the binary clutch assembly (BC) is shown schematically as a simple on/off switch to illustrate the two possible binary states. The second node 22 is continuously connected to the output member 15, and also to the first node 41 of the third gear set 40 via an interconnecting member 18. The second node 32 of the second gear set 30 is continuously connected to the third node 23 of the first gear set 20 via another interconnecting member 28.

As used herein for all friction clutches of the transmission 14, the letter "C" refers to a rotating clutch, "B" refers to a braking clutch, and the various numerals refer to the particular drive modes. For instance, "R" represents reverse, "1" corresponds to $1^{st}$ gear, "2" represents $2^{nd}$ gear, etc., all the way up to $6^{th}$ gear in the non-limiting 6-speed example of FIG. 1.

In the second gear set 30, the first node 31 is connected to the second node 42 of the third gear set 40 via another interconnecting member 27. The interconnecting member 27 is selectively connected or grounded to the stationary member 45 to brake the rotation of nodes 31 and 42, via engagement of clutch CBLR, wherein "L" refers to $1^{st}$ gear low. Likewise, the engagement of clutch CB26 connects node 43 of the third gear set 40 to the stationary member 45. The input member 13 is continuously connected to the third node 33 of the second gear set 30 via an interconnecting member 26, and is selectively connected to the third node 43 of the third gear set 40 via engagement of clutch C35R. Additionally, the input member 13 is selectively connected to the second node 42 of the third gear set 40 via engagement of clutch C456. While the example transmission 14 of FIG. 1 is shown in just one possible embodiment, any alternative embodiment of the transmission 14 should include a binary clutch assembly (BC) that is controlled in the targeted shift maneuver, i.e., a garage shift to neutral. In other words, a shift is executed to neutral, with neutral being the final state achieved via the method 100.

Referring to FIG. 2, possible shift maneuvers of the transmission 14 of FIG. 1 in the execution of the method 100 described below include a drive-to-neutral (D-N) shift and a drive-to-reverse (D-R) shift. As is well known in the art, a clutch-to-clutch shift from one gear state to another involves the offloading of clutch torque from one or more clutches to at least one other clutch. The particular clutches offloading torque are referred to as offgoing clutches, while the clutches receiving offloaded torque are referred to as oncoming clutches. In the present invention, the clutch CBLR of FIG. 1 never fully unloads during a D-N or D-R shift. This clutch is therefore referred to herein as an assisting (AST) clutch rather than an offgoing clutch.

When shifting out of drive (D) into neutral, i.e., the D-N shift, the binary clutch assembly (BC) of FIG. 1 acts as the offgoing clutch (OFG) and the clutch CBLR acts as the assisting clutch (AST). As noted above, while clutch torque capacity to the assisting clutch changes during the shift to neutral, with D-R being a special case of shift to reverse through the intermediate state of neutral, the assisting clutch remains at least partially engaged through the shift. As there is no oncoming clutch in a shift to neutral, none of the clutches of the transmission 14 are designated as oncoming clutches in a D-N shift. For the example transmission 14 of FIG. 1, clutches C456 and CB26 are not involved in the D-N or D-R shifts, as indicated in FIG. 2 by the dash (-) symbol. Clutch C35R is not involved in the shift to neutral (D-N shift), but is involved in the shift from neutral to reverse, and thus is shown as an oncoming clutch (ONC) in the D-R shift.

The designated function of the various clutches shown in FIGS. 1 and 2 during execution of the method 100 will now be described with respect to FIGS. 3 and 4 Referring first to FIG. 3, a set of traces 60 describes the control of various vehicle parameters by the controller 50 of FIG. 1 in the execution of method 100, specifically in the D-N phase of an example garage shift to neutral. Time (t) is plotted on the horizontal axis. Amplitude (A) is plotted on the vertical axis.

Trace 62 represents the state of the binary clutch assembly (BC) of FIG. 1. Trace 64 represents the offgoing clutch pressure ($P_{OFG}$) to the binary clutch assembly (BC) as commanded by the controller 50 via the clutch control signals (arrow 11). In the D-N shift, once again, the binary clutch assembly (BC) acts as the offgoing clutch, and thus trace 64 illustrates the changing pressure command to the binary clutch assembly (BC). Trace 66 ($P_{AST}$) shown as a dashed line represents the commanded clutch pressure command to the designated assisting clutch, in this instance clutch CBLR of FIG. 1. The rotational speed of the turbine (T) of FIG. 1 is represented by trace $N_T$.

The D-N shift controlled via the method 100 can be described in terms of the actions which occur during each time increment $t_0$-$t_1$, $t_1$-$t_2$, $t_2$-$t_3$, and $t_3$-$t_4$. When the vehicle 10 of FIG. 1 is in 1st gear, the binary clutch assembly (BC) must be released if a driver shifts into a range such as neutral (N), reverse (R), or park (P). In this case, the method 100 of FIG. 4 is used to control the binary clutch assembly (BC) and the holding clutches in a particular manner. Once in neutral (N), another shift routine may be used to engage reverse (R). That is, the method 100 terminates with the shift into neutral.

In general, the designated friction clutch required to hold torque or assist in 1st gear is exhausted as part of method 100 to within a calibrated range of that clutch's return spring pressure. As is known in the art, return spring pressure is the return pressure of a mechanical spring or other device used to bias a clutch apply piston (not shown). Below this pressure, it is assumed that the clutch has zero torque capacity. After torque capacity has been substantially removed from the holding clutch, i.e., either fully removed or decreased to a low non-zero value such as within 5-10% of the return spring pressure, the binary clutch assembly (BC) of FIG. 1 can be safely disengaged when the transmission 14 is in a neutral (N) state, and with only the assisting clutch CBLR applied. This is because if the binary clutch assembly (BC) is simply disengaged when the transmission 14 of FIG. 1 is still in 1st gear, a sudden change in output torque may result.

FIG. 4 describes an example embodiment of the method 100, and begins with step 102, wherein a driver of the vehicle 10 of FIG. 1 requests (REQ) a shift from drive (D) to neutral (N), e.g., via movement of a PRNDL lever, which in turn causes a shift of the PRNDL valve 25. In an example drive-to-neutral (D-N) shift, the binary clutch assembly (BC) of FIG. 1 acts as the designated offgoing clutch (OFG) and clutch CBLR acts as the designated assisting clutch (AST).

Up until $t_1$ of FIG. 3, the vehicle 10 of FIG. 1 is traveling in first gear locked. That is, the transmission 14 is in 1st gear and the binary clutch assembly (BC) is in a locked/engaged binary state (B1) as indicated by trace 62. Trace 64 in this same interval illustrates that the commanded apply pressure ($P_{OFG}$) of the binary clutch assembly (BC) is held at a calibrated maximum ($A_3$). The method 100 proceeds to step 104 at about $t_1$ when a request is made or detected for the D-N shift.

At step 104 of FIG. 4, the controller 50 of FIG. 1 next determines whether certain conditions exist (COND) which warrant execution of steps 106 through 120. Example conditions include determining whether vehicle speed is below a low calibrated threshold indicating that the vehicle 10 of FIG. 1 is stopped or slowly rolling. Brake position (arrow $B_X$) as shown in FIG. 1 may also be considered in some embodiments to verify that the vehicle 10 is or is intended to be slowed or stopped. Other conditions may include the engine 12 of FIG. 1 being in a running/engine-on state. The running status of the engine 12 may be determined by various means, including by key position, measured engine speed, measured turbine speed ($N_T$) from sensor ($S_T$) of FIG. 1, and/or acceleration, etc. The method 100 proceeds to step 105 if the conditions of step 104 are not satisfied. Otherwise, the method 100 proceeds to step 106.

At step 105, the controller 50 of FIG. 1, having determined at step 104 that the vehicle 10 is not executing a garage shift, executes the requested shift or other powertrain control actions without executing steps 106 through 120. Step 105 may include applying or releasing any of the friction clutches of FIG. 1 as needed to affect the appropriate shift. The method 100 then returns to step 102.

Step 106 entails reducing the clutch pressure to the binary clutch assembly (BC) to a calibrated pressure (CAL) at $t_1$, i.e., P→CAL. Here, the calibrated pressure is indicated on the vertical axis by $A_1$. The method 100 then proceeds to step 108.

At step 108, which resumes or commences at $t_1$ of FIG. 3 and continues until $t_2$, the binary clutch assembly (BC) is held (BC$^+$) at the calibrated apply pressure ($A_1$) from step 106 such that the binary clutch assembly (BC) remains fully engaged, i.e., in binary state (B1) as shown via trace 62.

At the same time, the assisting clutch pressure ($P_{AST}$) indicated by trace 66 is commanded by the controller 50 via clutch control signals (arrow 11) to decrease toward zero, either linearly at a calibrated rate as shown or nonlinearly, with this pressure control continuing until $t_2$ when trace 66 reaches the lower target pressure of $A_2$. As this occurs, the method 100 proceeds to step 110.

Step 110 includes determining whether slip (S $N_T$) on the turbine speed ($N_T$) is observed. As is known in the art, during a shift to neutral (N) an increase in turbine speed ($N_T$) is typically observed, which in FIG. 3 occurs just before $t_2$. Therefore, as part of step 110 the controller 50 of FIG. 1 may calculate an attained gear turbine speed ($N_{ATG}$), which as known in the art describes an estimated or calculated speed that the turbine (T) of FIG. 1 would attain if the transmission 14 were still in drive (D), e.g., based on a measured speed to the output member 15 of the transmission 14 and the gear ratio.

Step 110 may include comparing the attained gear turbine speed ($N_{ATG}$) to the measured turbine speed ($N_T$) from the turbine speed sensor ($S_T$) of FIG. 1. When a calibrated or predetermined difference in these values is detected, the controller 50 concludes that slip on the turbine speed ($N_T$), i.e., S $N_T$, is observed. As a result, the method 100 proceeds to step 112. Otherwise, the controller 50 repeats step 108 and 110 in a loop until such slip is detected, thus indicating that turbine speed ($N_T$) has begun to respond.

At step 112, which commences at $t_2$ and continues until $t_3$, pressure to the assisting clutch, e.g., clutch CBLR in the example used herein, may be controlled to and thereafter held at a calibrated pressure, e.g., a pressure value that is indexed to a calibrated return spring (RS) pressure such as RS±5-10%, or RS±5 Nm in another example embodiment. This is shown by the step increase in trace 66 at $t_2$.

At the same time, the offgoing clutch, i.e., the binary clutch assembly (BC), disengages, as indicated by the change in toque capacity or binary state from B1 (engaged/applied) to B2 (disengaged/released). In actuality, as will be appreciated by one of ordinary skill in the art, an axial position of any engaging portion (not shown) of the binary clutch assembly (BC) changes in the duration between B1 and B2. This action reduces the amount of noise and output torque change that is present during the shift since the binary clutch assembly (BC) is disengaged from a neutral state and not while the transmission 14 of FIG. 1 is in gear. The method 100 then proceeds to step 114.

Step 114 includes verifying that the binary clutch assembly (BC) of FIG. 1 has released, at which point the method 100 proceeds to step 116. Step 114 may entail measuring the position of the binary clutch assembly (BC) to determine the binary state, e.g., via the example position sensor ($S_{BC}$) shown in FIG. 1. Steps 112 and 114 are repeated in a loop until the binary clutch assembly (BC) is verified as released. The method 100 then proceeds to step 116.

At step 116, commencing at about $t_3$ of FIG. 3 and continuing until $t_4$, the controller 50 increases the assisting clutch pressure (trace 66) at a calibrated rate to restore torque capacity to the assisting clutch CBLR, and to thus subsequently re-engage clutch CBLR. The method 100 then proceeds to step 118.

Step 118 entails determining whether the pressure command to clutch CBLR reaches a calibrated threshold at the end of the ramp, as abbreviated "P=CAL?", an event which occurs at about $t_4$ of FIG. 3. Alternatively, the ramping of pressure can end after a calibrated amount of time. The method 100 proceeds to step 105 when this occurs, and the shift is complete, i.e., clutch pressure to the assisting clutch is fully applied. Steps 116 and 118 are repeated in a loop until the pressure command to clutch CBLR reaches the threshold. In this manner, the method 100 as executed by the controller 50 of FIG. 1 allows the binary clutch assembly (BC) to disengage smoothly during a garage shift to or through neutral.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an engine;
   a transmission having a friction clutch and a binary clutch assembly; and
   a controller in communication with the transmission, wherein the controller includes a processor and tangible, non-transitory memory on which is recorded instructions for executing a requested shift to neutral in which the friction clutch acts as an assisting clutch, wherein execution of the instructions by the processor causes the controller to:
   detect the requested shift of the transmission to neutral; and
   only when conditions are satisfied during the requested shift, to:
   automatically decrease pressure to the friction clutch such that a torque capacity of the friction clutch decreases from a full torque capacity and the friction clutch begins to slip;
   hold the binary clutch assembly at a calibrated pressure while the friction clutch slips;
   disengage the binary clutch assembly only when the binary clutch assembly is released and not loaded; and
   increase the pressure to the friction clutch to thereby restore the full torque capacity to the friction clutch and complete the requested shift to neutral.

2. The vehicle of claim 1, wherein the conditions include a speed of the vehicle being below a low calibrated threshold and the engine being in a running state.

3. The vehicle of claim 1, wherein the controller is configured to linearly decrease or ramp the pressure to the assisting clutch downward toward zero pressure.

4. The vehicle of claim 1, further comprising a torque converter having a pump connected to the engine and a turbine connected to the transmission, and a sensor that measures a speed of the turbine and transmits the measured turbine speed to the controller, wherein the controller is further configured to determine whether the binary clutch assembly is not loaded by comparing the measured turbine speed to an attained gear turbine speed.

5. The vehicle of claim 1, wherein the friction clutch has a calibrated return spring pressure, and wherein the controller automatically decreases the pressure to the friction clutch to a level that is within a predetermined range of the calibrated return spring pressure.

6. The vehicle of claim 1, further comprising a position sensor positioned with respect to the binary clutch assembly and configured to measure a position of the binary clutch assembly, wherein the controller receives the measured position and determines whether the binary clutch is released via the received measured position.

7. The vehicle of claim 1, wherein the transmission includes a gear set and a stationary member, and wherein the binary clutch assembly selectively connects a node of the gear set to the stationary member.

8. The vehicle of claim 1, wherein the transmission includes a stationary member, a first gear set, a second gear set, a third gear set, and an interconnecting member which continuously connects the second gear set to the third gear set, and wherein the binary clutch assembly selectively connects the first gear set to the stationary member and the friction clutch selectively connects the interconnecting member to the stationary member.

9. The vehicle of claim 8, further comprising a torque converter having a pump connected to the engine and a turbine continuously connected to the second gear set and selectively connectable to the third gear set via at least one additional friction clutch, wherein the friction clutch and the at least one additional friction clutch are both connected to the same node of the third gear set.

10. An assembly comprising:
a transmission having a friction clutch and a binary clutch assembly; and
a controller in communication with the transmission, wherein the controller includes a processor and tangible, non-transitory memory on which is recorded instructions for executing a requested shift to neutral, wherein execution of the instructions by the processor causes the controller to:
detect the requested shift of the transmission to neutral; and
only when conditions are satisfied during the requested shift, to:
automatically decrease pressure to the friction clutch such that torque capacity of the friction clutch decreases from a full torque capacity and begins to slip;
hold the binary clutch assembly at a calibrated pressure while the friction clutch slips;
disengage the binary clutch assembly only when the binary clutch assembly is released and not loaded; and
increase the pressure to the friction clutch to thereby restore the full torque capacity to the friction clutch and complete the requested shift to neutral.

11. The assembly of claim 10, wherein the set of conditions includes a speed of the vehicle below a low calibrated threshold and the engine being in a running state.

12. The assembly of claim 10, wherein the controller is configured to linearly decrease the pressure to the friction clutch toward zero pressure.

13. The assembly of claim 10, further comprising a torque converter having a pump connected to the engine and a turbine connected to the transmission, and a sensor that measures a rotational speed of the turbine and transmits the measured speed to the controller, wherein the controller is further configured to determine whether the binary clutch assembly is not loaded by comparing the measured turbine speed to an attained gear turbine speed.

14. The assembly of claim 10, wherein the friction clutch has a calibrated return spring pressure, and whether the controller automatically decreases the pressure to the friction clutch to a level that is within a predetermined range of the calibrated return spring pressure.

15. The assembly of claim 10, further comprising a position sensor positioned with respect to the binary clutch assembly and configured to measure a position of the binary clutch assembly, wherein the controller receives the measured position and determines whether the binary clutch is released via the received measured position.

16. The assembly of claim 10, wherein the transmission includes a gear set and a stationary member, and wherein the binary clutch assembly selectively connects a node of the gear set to the stationary member.

17. The assembly of claim 10, wherein the transmission includes a stationary member, a first gear set, a second gear set, a third gear set, and an interconnecting member which continuously connects the second gear set to the third gear set, and wherein the binary clutch assembly selectively connects the first gear set to the stationary member and the friction clutch selectively connects the interconnecting member to the stationary member.

18. A method of shifting a transmission in a vehicle having an engine, a friction clutch, and a binary clutch assembly, the method comprising:
detecting the requested shift of the transmission to neutral, including determining if a speed of the vehicle is below a low calibrated threshold and the engine is running;
determining whether predetermined conditions are satisfied; and
only when the predetermined conditions are satisfied during the requested shift:
automatically decreasing pressure to the friction clutch such that a torque capacity of the friction clutch decreases from a full torque capacity and the friction clutch begins to slip;
holding the binary clutch assembly at a calibrated pressure while the friction clutch slips;
disengaging the binary clutch assembly only when the binary clutch assembly is released and not loaded; and
increasing the pressure to the friction clutch to thereby restore the full torque capacity to the friction clutch and complete the requested shift to neutral.

19. The method of claim 18, wherein the vehicle includes a turbine, the method further comprising:
measuring a speed of the turbine via a speed sensor;
transmitting the measured turbine speed to the controller; and
determining, via the controller, whether the binary clutch assembly is not loaded by comparing the measured turbine speed to an attained gear turbine speed.

20. The method of claim 18, wherein the vehicle includes a position sensor positioned with respect to the binary clutch assembly, the method further comprising:
measuring a position of the binary clutch assembly via the position sensor;
transmitting the measured position to the controller;
receiving, via the controller, the measured position of the binary clutch assembly; and
determining whether the binary clutch is released via the received measured position.

* * * * *